United States Patent
Zong et al.

(10) Patent No.: US 11,645,192 B2
(45) Date of Patent: May 9, 2023

(54) GRAPH-BASED METHOD FOR INDUCTIVE BUG LOCALIZATION

(71) Applicant: NEC Laboratories America, Inc., Princeton, NJ (US)

(72) Inventors: Bo Zong, West Windsor, NJ (US); Haifeng Chen, West Windsor, NJ (US); Xuchao Zhang, Elkridge, MD (US)

(73) Assignee: NEC Corporation, Tokyo (JP)

( * ) Notice: Subject to any disclaimer, the term of this patent is extended or adjusted under 35 U.S.C. 154(b) by 104 days.

(21) Appl. No.: 17/191,964

(22) Filed: Mar. 4, 2021

(65) Prior Publication Data

US 2021/0286706 A1 Sep. 16, 2021

Related U.S. Application Data

(60) Provisional application No. 62/987,928, filed on Mar. 11, 2020.

(51) Int. Cl.
 *G06F 11/36* (2006.01)
 *G06F 40/30* (2020.01)
 *G06N 3/10* (2006.01)

(52) U.S. Cl.
 CPC .......... *G06F 11/3624* (2013.01); *G06F 40/30* (2020.01); *G06N 3/10* (2013.01)

(58) Field of Classification Search
 CPC ........ G06F 11/3624; G06F 40/30; G06N 3/10
 See application file for complete search history.

(56) References Cited

U.S. PATENT DOCUMENTS

| | | | |
|---|---|---|---|
| 7,739,653 B2 | 6/2010 | Venolia | |
| 8,898,637 B2 | 11/2014 | Surazski et al. | |
| 8,910,120 B2 | 12/2014 | Srinizasa et al. | |
| 9,244,510 B1 * | 1/2016 | Conrad | G06F 11/30 |
| 9,298,453 B2 | 3/2016 | Vangala et al. | |
| 2013/0179863 A1 | 7/2013 | Vangala et al. | |

(Continued)

FOREIGN PATENT DOCUMENTS

WO WO-2019143539 A1 * 7/2019 ............... G06F 8/30

OTHER PUBLICATIONS

Hongliang Liang et al., "Deep Learning with Customized Abstract Syntax Tree for Bug Localization", [Online], pp. 116309-116320, [Retrieved from Internet on Dec. 30, 2022], <https://ieeexplore.ieee.org/stamp/stamp.jsp?tp=&arnumber=8809752> (Year: 2019).*

*Primary Examiner* — Ziaul A Chowdhury
(74) *Attorney, Agent, or Firm* — Joseph Kolodka

(57) ABSTRACT

A computer-implemented method executed by at least one processor for software bug localization is presented. The method includes constructing a bug localization graph to capture relationships between bug tickets and relevant source code files from historical change-sets and an underlying source code repository, leveraging natural processing language tools to evaluate semantic similarity between a new bug ticket and a historical ticket, in response to the evaluated semantic similarity, for the new bug ticket, adding links between the new bug ticket a set of similar historical tickets, incorporating the new bug ticket in the bug localization graph, and developing a mathematical graph expression to determine a closeness relationship between the relevant source code files and the new bug ticket.

5 Claims, 8 Drawing Sheets

(56) References Cited

U.S. PATENT DOCUMENTS

| | | | | |
|---|---|---|---|---|
| 2014/0149435 A1* | 5/2014 | Sisman | ................ | G06F 11/362 |
| | | | | 707/751 |
| 2016/0246699 A1* | 8/2016 | Edri | ......................... | G06F 8/71 |
| 2019/0073293 A1* | 3/2019 | Sharma | .................. | G06F 16/22 |
| 2019/0391904 A1* | 12/2019 | Sabharwal | ........... | G06N 3/0445 |
| 2020/0097387 A1* | 3/2020 | Loyola | ................ | G06F 11/366 |
| 2020/0175174 A1* | 6/2020 | Bakalli | .................... | G06F 8/71 |

* cited by examiner

GRAPH-BASED METHOD FOR INDUCTIVE BUG LOCALIZATION

RELATED APPLICATION INFORMATION

This application claims priority to Provisional Application No. 62/987,928, filed on Mar. 11, 2020, incorporated herein by reference in its entirety.

BACKGROUND

Technical Field

The present invention relates to software development and, more particularly, to a graph-based method for inductive bug localization.

Description of the Related Art

A software bug is generally an error in software which may cause a program to stop its execution or to execute improperly. The bug may be introduced into the program due to a flaw in the software design or unintentionally by the program's developer while writing the program or code. If the bug is not located and corrected prior to the program being released to a user, or possibly installed in a user device, the program or device may malfunction with potentially negative repercussions to the user.

Software testing is generally conducted during a program's development stage to identify bugs. The test may check all the areas in the program which, depending on the size of the program, may be costly and time consuming. Alternatively, in order to reduce the cost and duration of the test, areas thought to have bugs, hereinafter referred to as bug-prone areas, may be selected for testing.

In some cases, testing may be performed manually, semi-automatically, automatically, or the like. The testing efforts may be focused on the entire program, on bug-prone areas, on specific aspects of the program, or the like.

SUMMARY

A computer-implemented method executed by at least one processor for software bug localization is presented. The method includes constructing a bug localization graph to capture relationships between bug tickets and relevant source code files from historical change-sets and an underlying source code repository, leveraging natural processing language tools to evaluate semantic similarity between a new bug ticket and a historical ticket, in response to the evaluated semantic similarity, for the new bug ticket, adding links between the new bug ticket a set of similar historical tickets, incorporating the new bug ticket in the bug localization graph, and developing a mathematical graph expression to determine a closeness relationship between the relevant source code files and the new bug ticket.

A system for software bug localization is also presented. The system includes a memory and a processor in communication with the memory, wherein the processor is configured to construct a bug localization graph to capture relationships between bug tickets and relevant source code files from historical change-sets and an underlying source code repository, leverage natural processing language tools to evaluate semantic similarity between a new bug ticket and a historical ticket, in response to the evaluated semantic similarity, for the new bug ticket, add links between the new bug ticket a set of similar historical tickets, incorporate the new bug ticket in the bug localization graph, and develop a mathematical graph expression to determine a closeness relationship between the relevant source code files and the new bug ticket.

A non-transitory computer-readable storage medium comprising a computer-readable program is presented for software bug localization, wherein the computer-readable program when executed on a computer causes the computer to perform the steps of constructing a bug localization graph to capture relationships between bug tickets and relevant source code files from historical change-sets and an underlying source code repository, leveraging natural processing language tools to evaluate semantic similarity between a new bug ticket and a historical ticket, in response to the evaluated semantic similarity, for the new bug ticket, adding links between the new bug ticket a set of similar historical tickets, incorporating the new bug ticket in the bug localization graph, and developing a mathematical graph expression to determine a closeness relationship between the relevant source code files and the new bug ticket.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

In software development, bug localization is the process of finding portions of source code associated to a submitted bug report. This task has been modeled as an information retrieval task at the source code file, where the report is a query.

The exemplary embodiments deal with the problem of bug localization in software engineering. Given a source code repository and a bug ticket that describes an encountered problem in natural language, the goal is to locate source code files (e.g., from the code repository) that are related to the problem stated in the bug ticket.

The exemplary embodiments focus on the following inductive setting.

Historical bug tickets and the change-sets (e.g., relevant source code files) for individual bug tickets are available.

The goal is to provide bug localization for new incoming bug tickets.

The exemplary embodiments introduce Graph-based Bug Localization (GBL) to address the bug localization problem under the setting stated above.

The exemplary embodiments solve the problem as follows:

First, the exemplary methods construct a bug localization graph to capture the relationships among bug tickets and relevant source code files from historical change-sets and the underlying source code repository.

Then, the exemplary methods leverage natural language processing tools to evaluate semantic similarity between a new bug ticket and a historical bug ticket.

After that, given the similarity evaluated, for a new bug ticket, the exemplary methods add links between the new ticket and its top similar historical bug tickets so that the new ticket is also included in the bug localization graph.

Finally, the exemplary methods develop a graph algorithm to discover or determine top close source code files for the new bug ticket.

The features of GBL include at least the following:

Bug localization graph construction, which captures the relationships between bug tickets and source code files.

A natural-language-processing based method to identify similar historical bug tickets so that the exemplary methods can connect a new bug ticket with its similar tickets and bring or incorporate the new ticket into the bug localization graph.

A graph algorithm for evaluating the closeness between new tickets and source code files.

Figure 1:
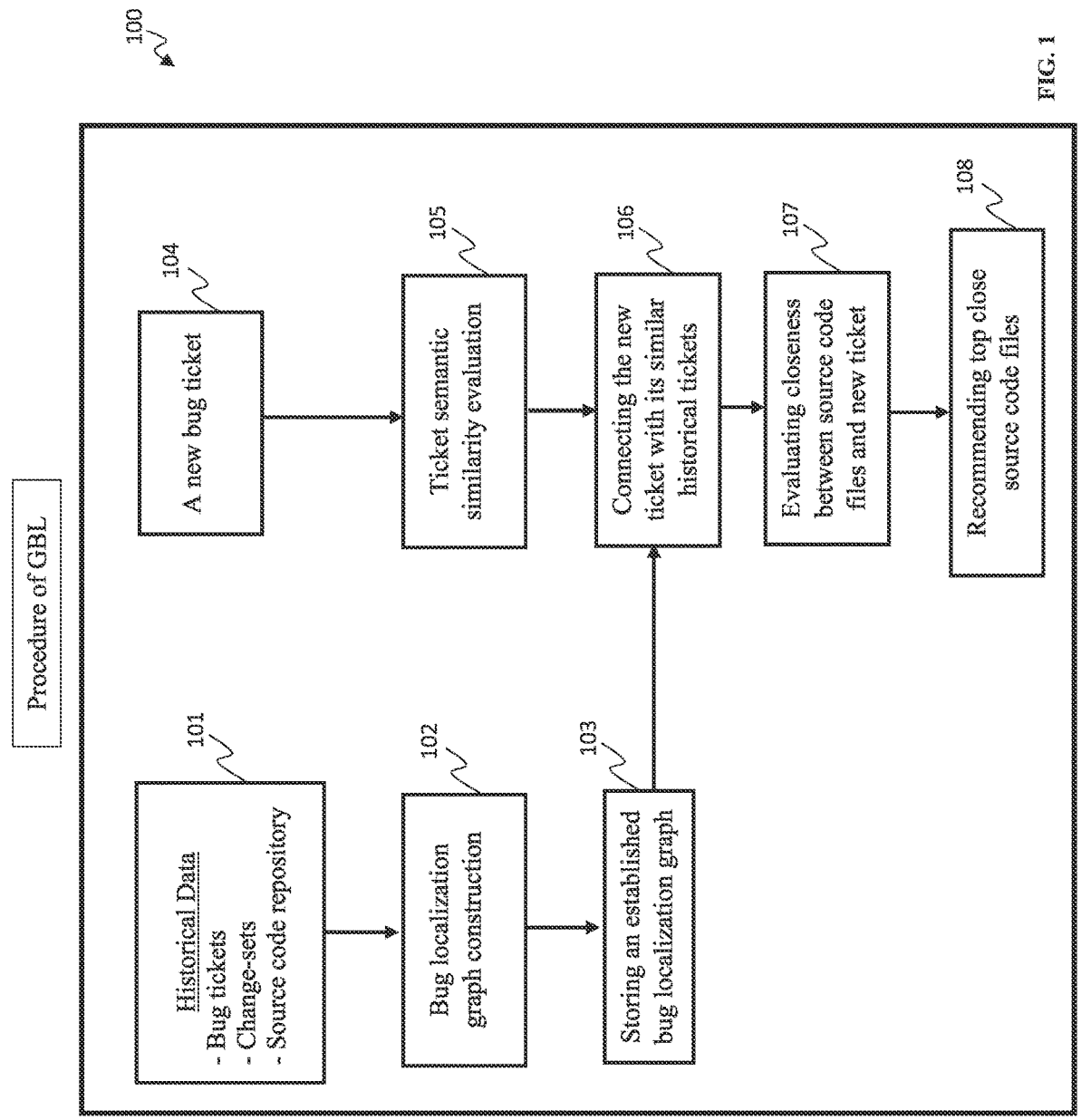
FIG. 1 is a block/flow diagram illustrating an exemplary procedure for graph-based bug localization (GBL), in accordance with embodiments of the present invention.

FIG. 1 is a block/flow diagram 100 illustrating an exemplary procedure for graph-based bug localization (GBL), in accordance with embodiments of the present invention.

Construction of bug localization graphs from historical data includes blocks 101-103 and bug source code file recommendations for a new bug ticket includes blocks 104-108.

Regarding block 101, historical data, historical data include three types of data.

The first type of data is bug tickets. Bug tickets are documents created by software engineers, reporting encountered problems/bugs in a source code repository. In particular, the bugs are described in natural language.

The second type of data is change-sets. A change-set of a bug ticket refers to a set of source code files where a software engineer made changes to fix the reported bug.

The third type of data is source code repository. Source code repository includes all source code files under management.

Regarding block 102, bug localization graph construction, the exemplary embodiments construct a bug localization graph from change-sets and the source code repository. In the graph, a node denotes or represents either a source code file or a bug ticket. An edge between two nodes indicates the two nodes are related. If a source code file is in a bug ticket's change-set, they are related. If the implementation in one source code file refers to data types defined in another source code file, the two source code files are related.

Regarding block 103, storing an established bug localization graph, the exemplary method stores the bug localization graph established in block 102 into a database.

Regarding block 104, a new bug ticket, when a new bug ticket arrives, its natural-language based description states the reported bug, however, its change-set is unknown.

Regarding block 105, ticket semantic similarity evaluation, the exemplary methods evaluate semantic similarity between the new ticket and historical bug tickets using natural language processing tools.

Regarding block 106, connecting the new bug ticket with its similar historical bug tickets, based on the similarity evaluation provided by block 105, the exemplary methods select similar historical bug tickets and build edges between the new ticket and its similar tickets.

Regarding block 107, evaluating closeness between the new ticket and source code files, the exemplary methods leverage the graph algorithm to evaluate closeness between the ticket and the source code files.

Regarding block 108, recommending top close source code files, based on the closeness provided by block 107, the exemplary methods make recommendations to end users, where top close source code files are recommended with respect to the new ticket.

Figure 2:
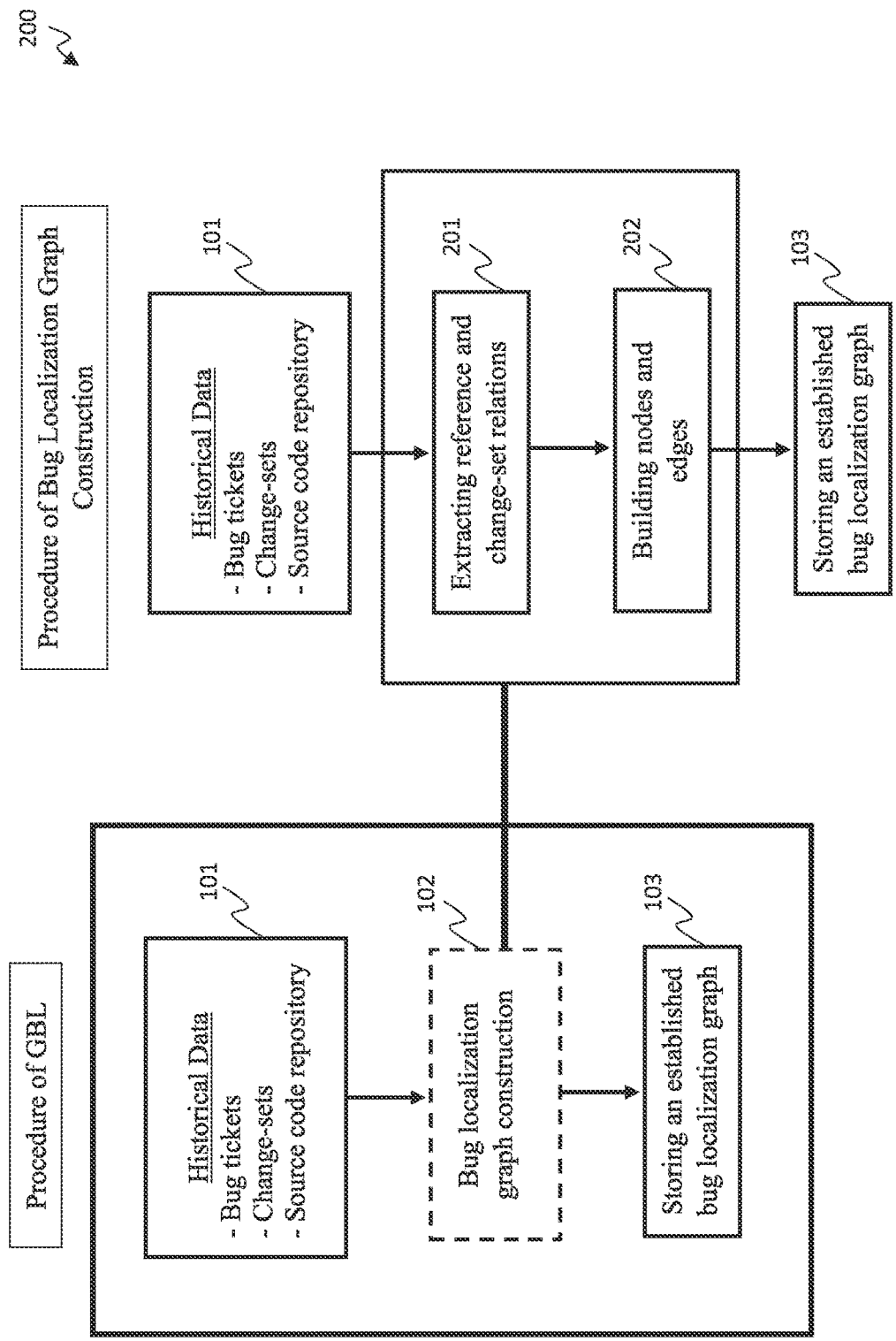
FIG. 2 is a block/flow diagram illustrating an exemplary procedure of bug localization graph construction, in accordance with embodiments of the present invention.

FIG. 2 is a block/flow diagram 200 illustrating an exemplary procedure of bug localization graph construction, in accordance with embodiments of the present invention.

Regarding block 201, extracting reference and change-set relations, the exemplary methods extract reference and change-set relations from a source code repository and historical change-set data.

With respect to reference relations, across different programming languages, in one source code file, the following data types are usually implemented: classes, structures, functions, and so on. When a data type in one source code file is referred to or used in another source code file, it is said that these two source code files have reference relations. Given a source code repository, the exemplary methods extract possible reference relations between source code files.

With respect to change-set relations, if a source code file is in the change-set of a bug ticket, the exemplary methods indicate that there is a change-set relation between the source code file and the bug ticket.

Regarding block 202, building nodes and edges, given a source code repository and historical change-sets for tickets, a bug localization graph is constructed by including a plurality of nodes and a plurality of edges connecting certain nodes.

With respect to nodes, single nodes are used to represent source code files or tickets.

With respect to edges, if two nodes have reference relations, there is an edge between the two nodes. If two nodes have change-set relations, there is an edge between the two nodes.

The output of block 202 is a bug localization graph that captures relations among tickets and source code files.

Figure 3:
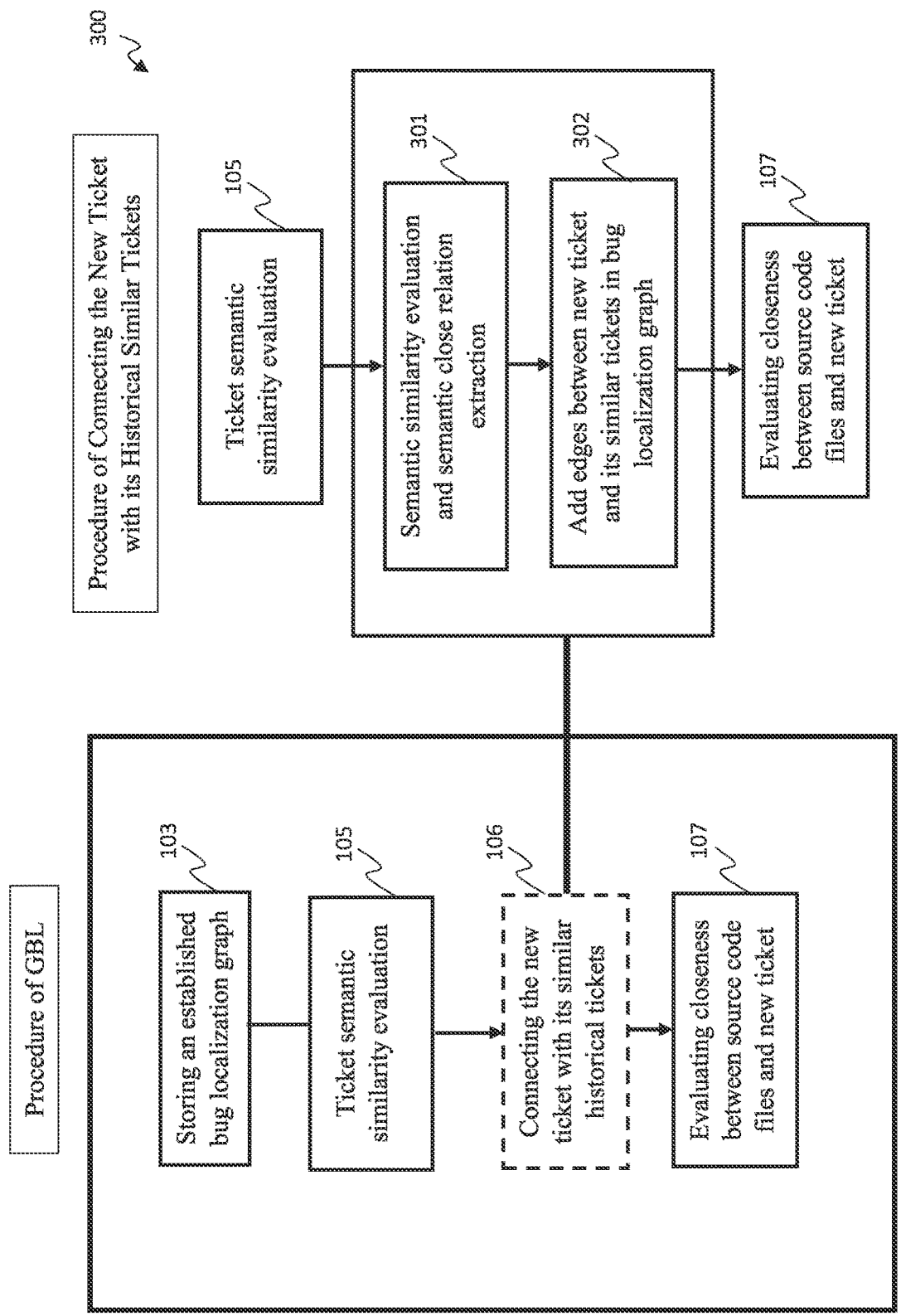
FIG. 3 is a block/flow diagram illustrating an exemplary procedure of connecting a new ticket with its historical similar tickets, in accordance with embodiments of the present invention.

FIG. 3 is a block/flow diagram 300 illustrating an exemplary procedure of connecting a new ticket with its historical similar bug tickets, in accordance with embodiments of the present invention.

FIG. 3 depicts the detailed procedure of connecting the new ticket with its historical similar bug tickets. For the ease of discussion, it is supposed that $S(t_1, t_2)$ is a function that evaluates semantic similarity between $t_1$ and $t_2$ provided by block 105.

Regarding block 301, semantic similarity evaluation and semantic close relation extraction, given a new ticket t, the exemplary methods leverage the function S to compare t against all the historical bug tickets. The output of the function S is usually a numeric value r, where r is larger if two tickets are more similar. Using a pre-defined threshold θ, the exemplary methods can filter dissimilar tickets.

If r>θ, two tickets are similar, otherwise, the two tickets are dissimilar.

Regarding block 302, adding extra edges, for a given new ticket t, the exemplary methods obtain its similar tickets from block 301. If t and $t_1$ are similar, the exemplary methods add an edge between t and $t_1$ into the bug localization graph from block 103. If t has m similar historical bug tickets, in total m edges are added into the bug localization graph.

Figure 4:
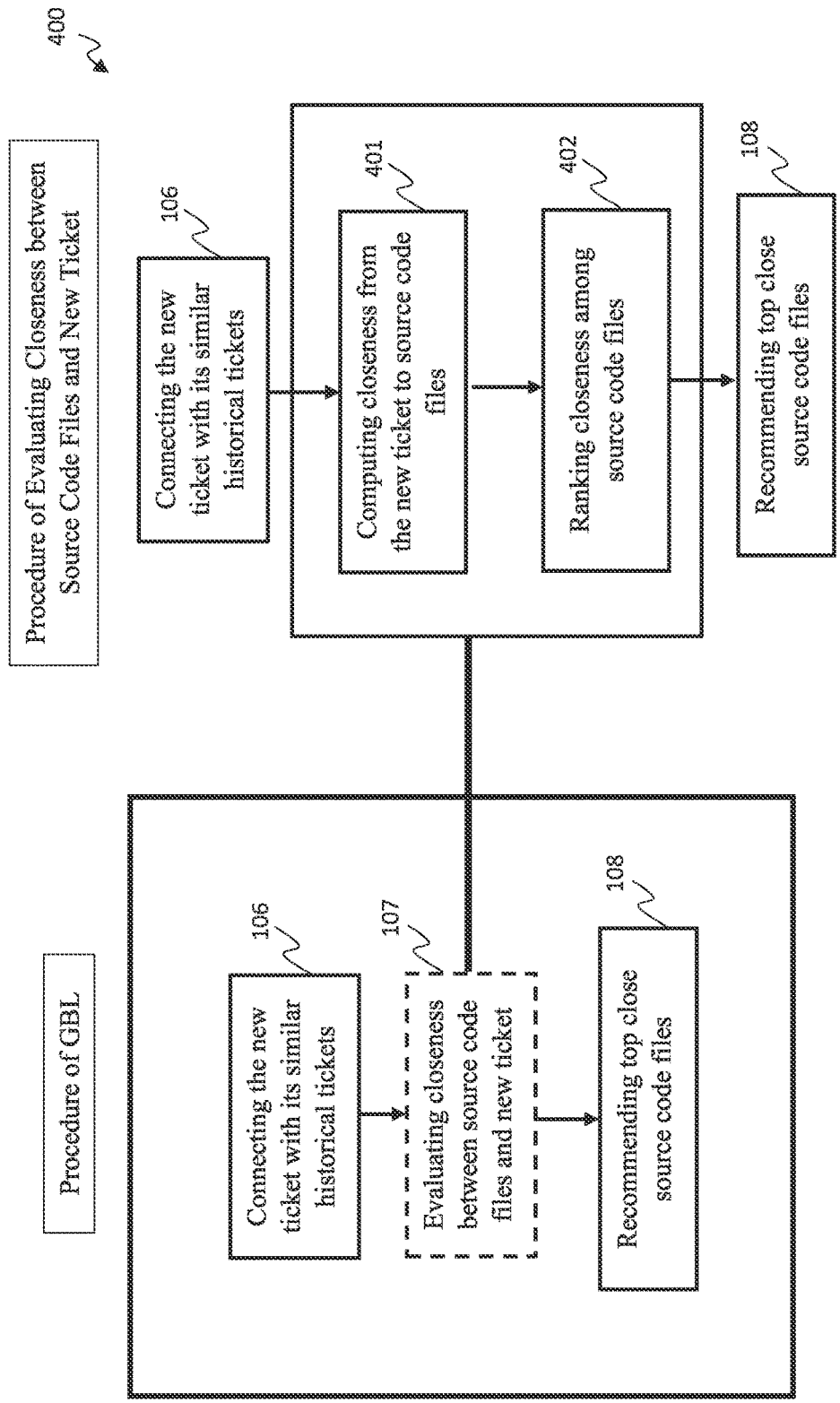
FIG. 4 is a block/flow diagram illustrating an exemplary procedure of evaluating closeness between source code files and the new ticket, in accordance with embodiments of the present invention.

FIG. 4 is a block/flow diagram 400 illustrating an exemplary procedure of evaluating closeness between source code files and the new ticket, in accordance with embodiments of the present invention.

Regarding block 401, computing closeness from the new ticket to source code files, the exemplary methods compute the closeness parameters as follows.

With respect to initialization, let c[i] be the closeness score from the new ticket node to node $v_i$.

The exemplary methods initialize c[i] as 0.

Then let $v_0$ be the node that denotes the new ticket and assign c[0]=1.

With respect to the closeness score update, for each node $v_i$, its closeness score is updated by the following equation:

$$c^{(k+1)}[i] = \lambda \sum_{v_j \in N_i} \frac{1}{d_j} c^{(k)}[j],$$

where $N_i$ is a set of one-hop neighbors of $v_i$ in the bug localization graph, $d_j$ is a node degree of neighbor $v_j$, k is an iteration number, and λ is a pre-defined numerical value between 0 and 1.

For the new ticket node $v_0$, the exemplary methods make additional updates as follows:

$$c^{(k+1)}[0] = c^{(k+1)}[0] + (1-\lambda)\Sigma_{j \neq 0} c^{(k)}[j].$$

With respect to stop criteria, closeness score updates are performed iteratively. The updates are stopped if a pre-defined or predetermined maximum iteration number is reached.

Regarding block 402, ranking closeness among source code files, for source code files, the exemplary methods rank them based on their closeness score computed from block 401. If one source code file has a higher closeness score, its rank gets closer to the top of a ranking list.

Figure 5:
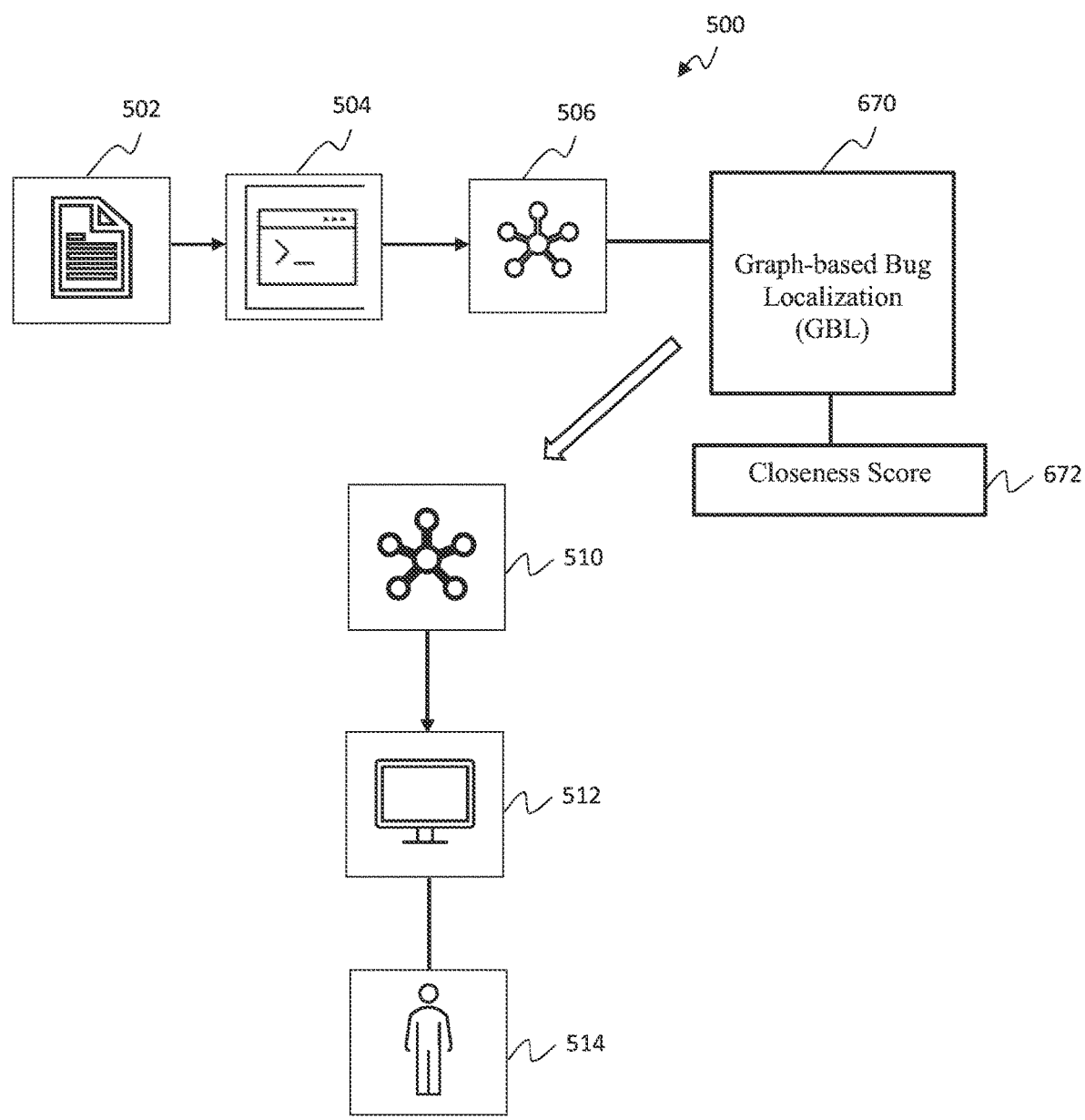
FIG. 5 is a block/flow diagram of practical applications for the graph-based bug localization (GBL), in accordance with embodiments of the present invention.

FIG. 5 is a block/flow diagram 500 of practical applications for GBL, in accordance with embodiments of the present invention.

Given source code files 502 and a bug ticket 504, a graph-based bug localization 670 is constructed to capture relationships between source code files 502 and the bug ticket 504. The relationship is based on historical change-sets and the underlying source code repository. Existing natural language processing tools 506 are leveraged to evaluate semantic similarity between a new bug ticket and a historical bug ticket. Links are then added between the new ticket and its top historical bug tickets so that a new ticket (new node) is added to the bug localization graph 510. A graph algorithm providing a closeness score 672 is developed to uncover top close source code files for the new bug ticket. The bug localization graph 510 can be provided or displayed on a user interface 512 handled by a user 514.

Figure 6:
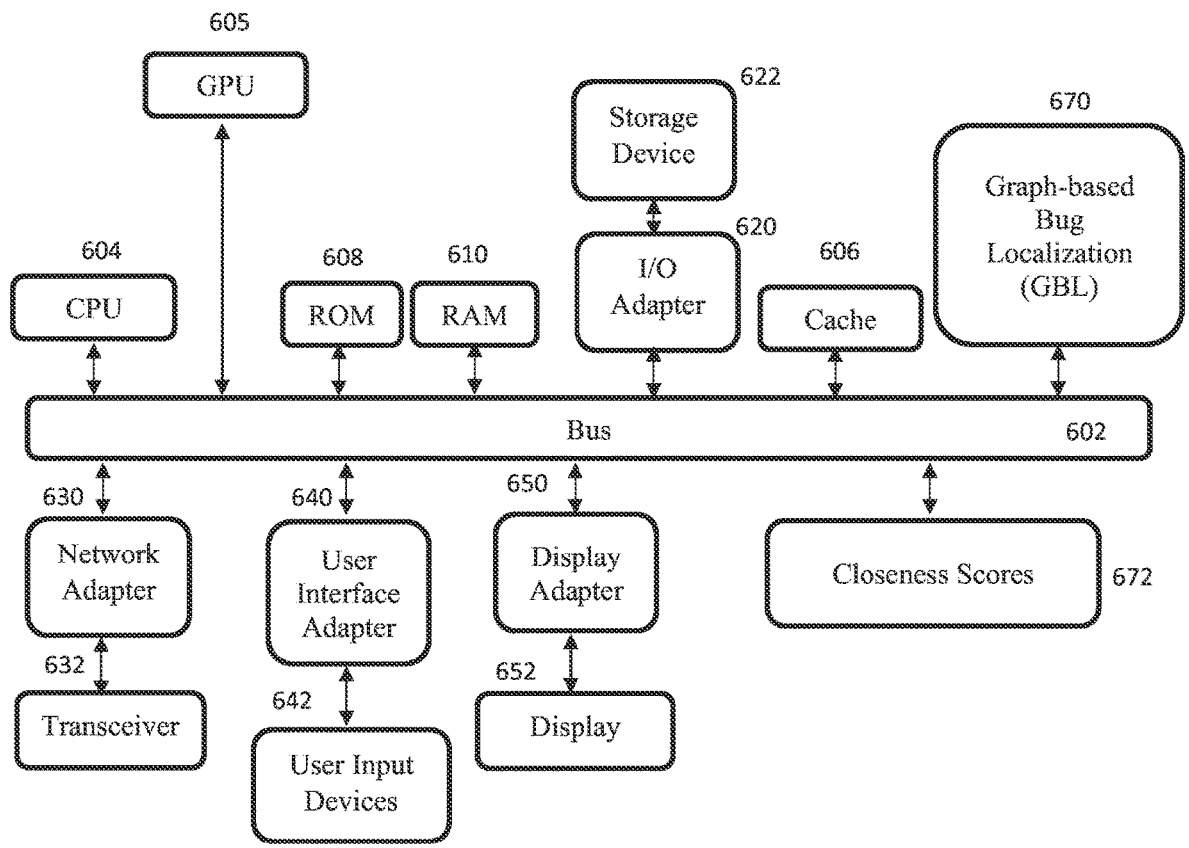
FIG. 6 is an exemplary processing system for GBL, in accordance with embodiments of the present invention.

FIG. 6 is an exemplary processing system for GBL, in accordance with embodiments of the present invention.

The processing system includes at least one processor (CPU) 604 operatively coupled to other components via a system bus 602. A GPU 605, a cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Additionally, graph-based bug localization 670 can be employed to execute the graph algorithm or mathematical graph expression of the closeness function 672.

A storage device 622 is operatively coupled to system bus 602 by the I/O adapter 620. The storage device 622 can be any of a disk storage device (e.g., a magnetic or optical disk storage device), a solid-state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 7:
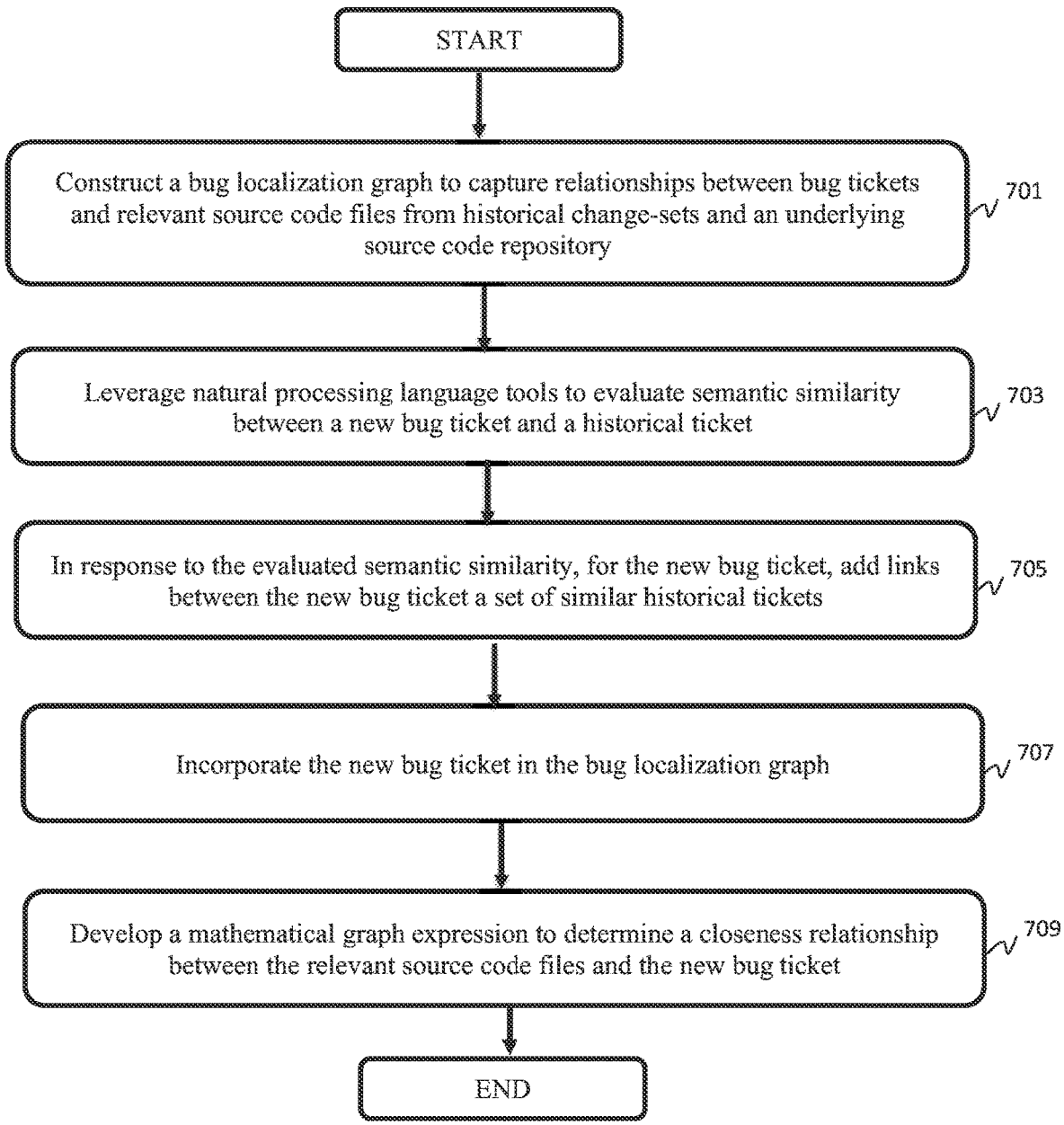
FIG. 7 is a block/flow diagram of a method for GBL, in accordance with embodiments of the present invention.

FIG. 7 is a block/flow diagram of a method for GBL, in accordance with embodiments of the present invention.

At block 701, construct a bug localization graph to capture relationships between bug tickets and relevant source code files from historical change-sets and an underlying source code repository.

At block 703, leverage natural processing language tools to evaluate semantic similarity between a new bug ticket and a historical bug ticket.

At block 705, in response to the evaluated semantic similarity, for the new bug ticket, add links between the new bug ticket a set of similar historical bug tickets.

At block 707, incorporate the new bug ticket in the bug localization graph.

At block 709, develop a mathematical graph expression to determine a closeness relationship between the relevant source code files and the new bug ticket.

Figure 8:
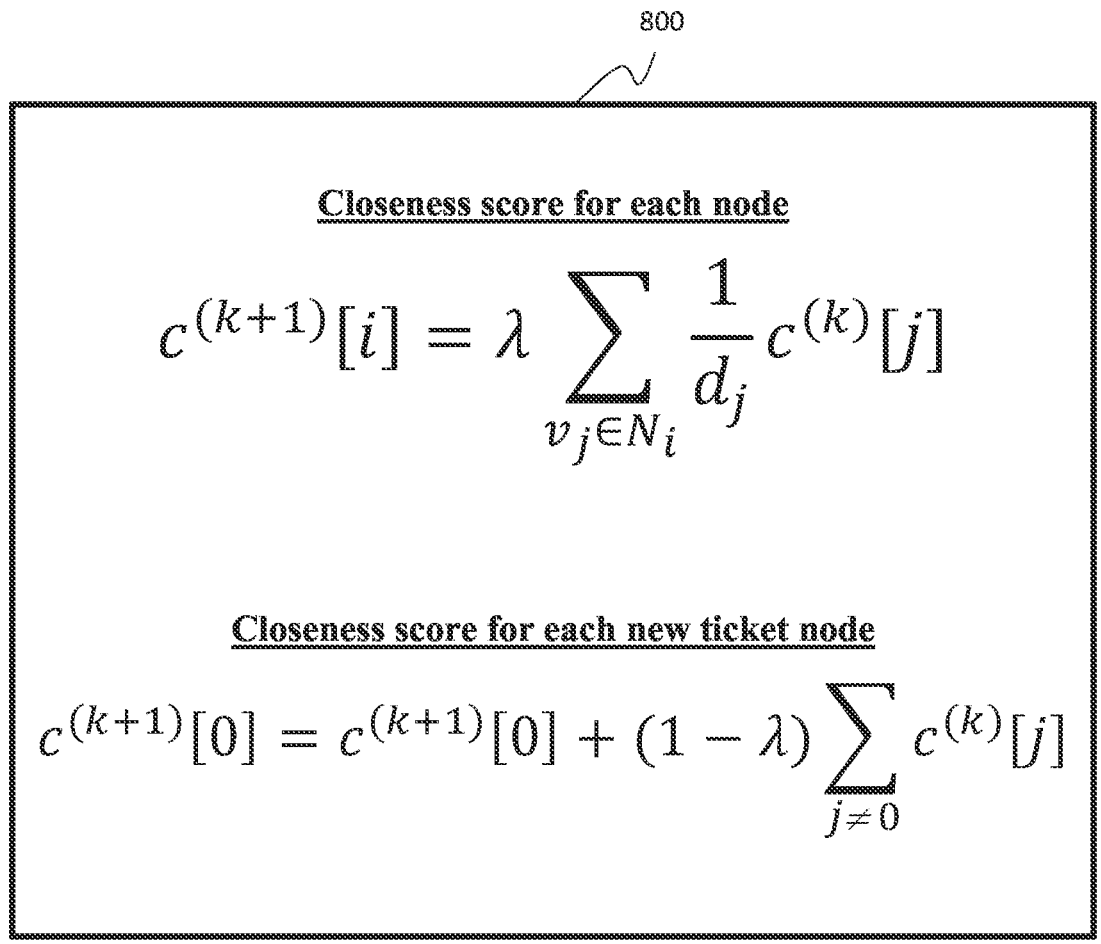
FIG. 8 are closeness score equations for GBL, in accordance with embodiments of the present invention.

FIG. 8 is an equation for closeness scores 800 for GBL, in accordance with embodiments of the present invention.

The closeness scores 800 can be implemented by a graph algorithm or a mathematical graph expression.

In the present disclosure a "code" may refer to a software representation of the software undergoing testing (SUT). The code may be, for example, a binary code of low-level instructions, Java byte code, a high-level code, or the like. The SUT may include system software, application software, or any other type of computer program, as a whole or in components of the whole program.

In the present disclosure, a "developer" may refer to a person participating in the development of the SUT. The developer may be a program designer, a code writer, software tester, quality assurance (QA) personnel, or other personnel which may be involved in the development of the software from the conceptual stage until release to client following testing. The developer may also be a user of the SUT during the development stage of the SUT. The term "developer" may also refer to one a person with past experience in development of software programs.

In the present disclosure a "testing strategy" may refer to any decision regarding how testing is performed, such as which tools/resources are being used (e.g., test generators, formal verification tools, manual testers, or the like) and how such resources are used. For example, one testing strategy may be testing only of a sub-portion of the modules of the SUT. Another testing strategy may be testing different modules using different resources, such as using formal verification tools in testing one module and using a test suite to test a second module. Yet another testing strategy may be to test different aspects of the SUT, such as to test security, test concurrency, or the like.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed by at least one processor for software bug localization, the method comprising:
   constructing a bug localization graph to capture relationships between bug tickets and relevant source code files from historical change-sets and an underlying source code repository;
   leveraging a natural language processing tool to evaluate semantic similarity between a new bug ticket and a historical ticket;
   in response to the evaluated semantic similarity, for the new bug ticket, adding links between the new bug ticket a set of similar historical tickets;
   incorporating the new bug ticket in the bug localization graph; and
   developing a mathematical graph expression to determine a closeness relationship between the relevant source code files and the new bug ticket,
   wherein constructing the bug localization graph includes extracting reference relations and change-set relations;
   wherein the bug localization graph includes a plurality of nodes and a plurality of edges connecting the nodes, each node representing either a relevant source code file or a bug ticket, and wherein two nodes are connected if they have reference relations; and
   wherein the mathematical graph expression generates a closeness score for each new bug ticket node.

2. The method of claim 1, wherein updates for the closeness score are performed iteratively.

3. A system for software bug localization, the system comprising:
   a memory; and
   a processor in communication with the memory, wherein the processor runs program code to:
      construct a bug localization graph to capture relationships between bug tickets and relevant source code files from historical change-sets and an underlying source code repository;
      leverage a natural language processing tool to evaluate semantic similarity between a new bug ticket and a historical ticket;
      in response to the evaluated semantic similarity, for the new bug ticket, add links between the new bug ticket a set of similar historical tickets;
      incorporate the new bug ticket in the bug localization graph; and
      develop a mathematical graph expression to determine a closeness relationship between the relevant source code files and the new bug ticket,
      wherein constructing the bug localization graph includes extracting reference relations and change-set relations;
      wherein the bug localization graph includes a plurality of nodes and a plurality of edges connecting the nodes, each node representing either a relevant source code file or a bug ticket, and wherein two nodes are connected if they have reference relations; and
      wherein the mathematical graph expression generates a closeness score for each new bug ticket node.

4. The system of claim 3, wherein updates for the closeness score are performed iteratively.

5. A non-transitory computer-readable storage medium comprising a computer-readable program for software bug localization, wherein the computer-readable program when executed on a computer causes the computer to perform the steps of:
   constructing a bug localization graph to capture relationships between bug tickets and relevant source code files from historical change-sets and an underlying source code repository;
   leveraging a natural language processing tool to evaluate semantic similarity between a new bug ticket and a historical ticket;
   in response to the evaluated semantic similarity, for the new bug ticket, adding links between the new bug ticket a set of similar historical tickets;
   incorporating the new bug ticket in the bug localization graph; and
   developing a mathematical graph expression to determine a closeness relationship between the relevant source code files and the new bug ticket,
   wherein constructing the bug localization graph includes extracting reference relations and change-set relations;
   wherein the bug localization graph includes a plurality of nodes and a plurality of edges connecting the nodes, each node representing either a relevant source code file or a bug ticket, and wherein two nodes are connected if they have reference relations; and
   wherein the mathematical graph expression generates a closeness score for each new bug ticket node.

* * * * *